United States Patent
Oswald et al.

(10) Patent No.: US 7,176,668 B2
(45) Date of Patent: Feb. 13, 2007

(54) SWITCHING REGULATOR WITH ADVANCED SLOPE COMPENSATION

(75) Inventors: Richard K. Oswald, San Jose, CA (US); Tamotsu Yamamoto, Cupertino, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 189 days.

(21) Appl. No.: 10/885,788

(22) Filed: Jul. 8, 2004

(65) Prior Publication Data

US 2006/0006854 A1    Jan. 12, 2006

(51) Int. Cl.
G05F 1/56 (2006.01)
(52) U.S. Cl. ............................. 323/285; 323/288
(58) Field of Classification Search .............. 323/282, 323/285, 288
See application file for complete search history.

(56) References Cited

U.S. PATENT DOCUMENTS

| | | | |
|---|---|---|---|
| 4,943,902 A * | 7/1990 | Severinsky | 363/80 |
| 5,305,192 A | 4/1994 | Bonte et al. | |
| 5,479,090 A * | 12/1995 | Schultz | 323/284 |
| 5,600,234 A * | 2/1997 | Hastings et al. | 323/282 |
| 5,929,620 A * | 7/1999 | Dobkin et al. | 323/288 |
| 5,949,229 A * | 9/1999 | Choi et al. | 323/285 |
| 5,982,160 A * | 11/1999 | Walters et al. | 323/282 |
| 6,066,943 A * | 5/2000 | Hastings et al. | 323/285 |
| 6,222,356 B1 | 4/2001 | Taghizadeh-Kaschani | |
| 6,229,293 B1 * | 5/2001 | Farrenkopf | 323/288 |
| 6,366,070 B1 * | 4/2002 | Cooke et al. | 323/284 |
| 6,498,466 B1 | 12/2002 | Edwards | |
| 6,522,116 B1 * | 2/2003 | Jordan | 323/288 |
| 6,611,131 B2 | 8/2003 | Edwards | |
| 6,744,241 B2 * | 6/2004 | Feldtkeller | 323/207 |
| 6,828,766 B2 * | 12/2004 | Corva et al. | 323/284 |
| 6,873,140 B2 * | 3/2005 | Saggini et al. | 323/283 |
| 6,894,471 B2 * | 5/2005 | Corva et al. | 323/282 |
| 7,030,596 B1 * | 4/2006 | Salerno et al. | 323/282 |
| 2003/0025484 A1 | 2/2003 | Edwards | |

OTHER PUBLICATIONS

"Overview of Feedback Control for Converters." Voltage-mode and Current-Mode Controls for DC-DC Converters. pp. 600-606.

* cited by examiner

Primary Examiner—Jeffrey Sterrett
(74) Attorney, Agent, or Firm—McDermott Will & Emery LLP (57) ABSTRACT

A switching regulator circuit with improved slope compensation for providing a regulated voltage to a load. The regulator circuit includes a power source and a switch circuit configured to control the coupling of the power source to the load. The operation of the switch circuit is controlled by a control signal generated by a control circuit. A feedback circuit is provided for generating a feedback signal indicative of the regulated voltage provided by the switching regulator circuit to the load. A circuit is provided to generate a sensed signal indicative of the current supplied by the power source. The regulator circuit further includes a timing signal generator for generating a timing signal, a ramp signal generator for generating a ramp signal, and a current source controlled by the ramp signal for generating a compensation signal indicative of the ramp signal. The control circuit generates the control signal based on the compensation signal, the timing signal, the sensed signal and the feedback signal.

4 Claims, 6 Drawing Sheets

SWITCHING REGULATOR WITH ADVANCED SLOPE COMPENSATION

FIELD OF DISCLOSURE

This disclosure generally relates to improved switching regulator circuits, and more specifically, to methods and circuits to effectively implement slope compensation in switching regulator circuits with reduced cost and design complexity.

BACKGROUND OF THE DISCLOSURE

A voltage regulator provides a predetermined and substantially constant output voltage to a load from a voltage source that may be poorly-specified or fluctuating. One type of commonly used regulator is a switching regulator, which supplies a flow of current from a voltage source to a load in the form of discrete current pulses. To create the discrete current pulses, switching regulators usually employ a switch, such as a power transistor, to control the current supply. The current pulses are then converted into a steady load current with an inductive storage element. By controlling the duty cycle of this switch, i.e., the percentage of time that the switch is ON relative to the total period of the switching cycle, the switching regulator can regulate the load voltage.

In current-mode switching voltage regulators, i.e., a switching regulator that is controlled by a current-derived signal in the regulator, there is an inherent instability when the duty cycle exceeds 50% with fixed frequency and continuous current mode, and 67% with fixed frequency and discontinuous current mode (i.e., when the switch is ON for more than 50% or 67% of a given switching period). In order to maintain stability of such current-mode switching regulators, the current-derived signal used to control the regulator is adjusted by, for example, applying a slope compensation signal.

One method of producing such a slope compensation signal is to use a portion of an oscillator signal as the compensation signal. The oscillator signal may be, for example, a ramp signal that is used to generate a clock signal that controls the switching of the regulator. The slope compensation signal can be applied by either adding the ramp signal to the current-derived signal, or by subtracting it from a control signal.

Figure 1:
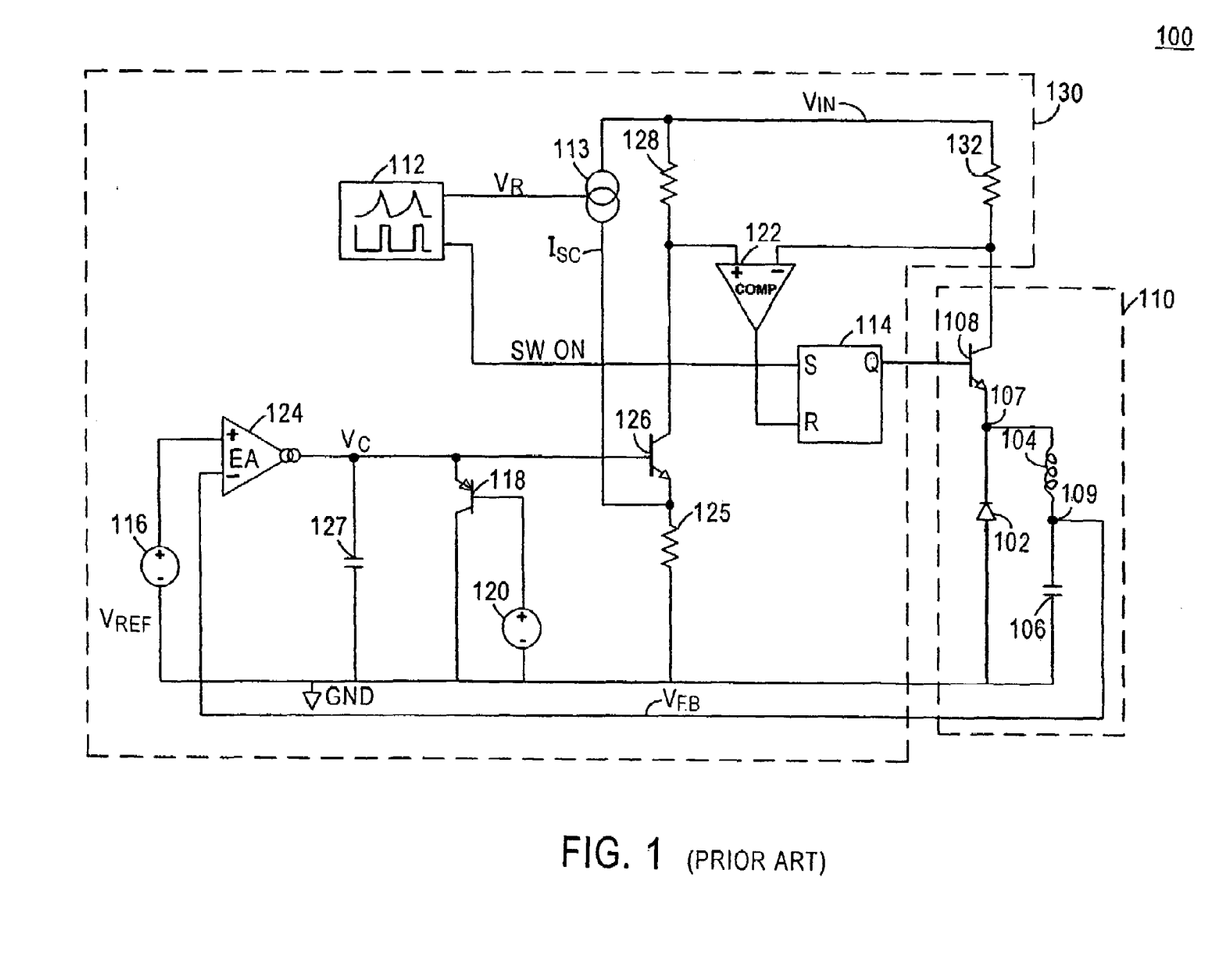
FIG. 1 shows the circuit diagram of a conventional current-mode switching regulator.

FIG. 1 shows an example of a current-mode switching regulator 100 utilizing slope compensation. Voltage regulator 100 generally comprises an output circuit 110 and a control circuit 130. A switch timing circuit 112 that is capable of producing substantially in-phase ramp and clock signals supplies a control signal SW ON that sets a latch 114. While latch 114 is set, it provides a signal to output circuit 110 that causes a switch 108 to turn ON and provide current from an input voltage source VIN to an output node 109. Latch 114 remains set until an output signal from a current comparator 122 causes latch 114 to reset. When reset, latch 114 turns switch 108 OFF so that current is no longer drawn from $V_{IN}$. Current comparator 122 determines when to reset latch 114 by comparing a signal that is indicative of the current supplied to output circuit 110 with a signal representing a current threshold value, i.e., a voltage across resistor 128, generated by an error amplifier 124 and a slope compensation signal $I_{SC}$.

The primary purpose of output circuit 110 is to provide current pulses as directed by control circuit 130, and to convert those current pulses into a substantially constant output current. Output circuit 110 includes power switch 108 coupled to $V_{IN}$ (through a sensing resistor 132) and a node 107, a catch diode 102 coupled from node 107 to ground, an inductor 104 coupled from node 107 to output node 109, and a capacitor 106 coupled from output node 109 to ground. Although switching element 108 is depicted as a bipolar junction transistor (BJT), any other suitable switching element may be used if desired.

The operation of output circuit 110 can be divided into two periods. The first is when power switch 108 is ON, and the second is when power switch 108 is OFF. During the ON period, current passes from $V_{IN}$ through switch 108 and flows through inductor 104 to output node 109. During this period, catch diode 102 is reverse-biased. After power switch 108 turns OFF, however, inductor 104 still has current flowing through it. The former current path from $V_{IN}$ through switch 108 is now open-circuited, causing the voltage at node 107 to drop such that catch diode 102 becomes forward-biased and starts to conduct. This maintains a closed current loop through the load. When power switch 108 turns ON again, the voltage at node 107 rises such that catch diode 102 becomes reverse-biased and again turns OFF.

As shown in FIG. 1, error amplifier 124 senses the output voltage of regulator 100 via a feedback signal $V_{FB}$. Error amplifier 124, which is preferably a transconductance amplifier, compares $V_{FB}$ with a reference voltage 116 ($V_{REF}$) that is also connected to amplifier 124. A control signal, $V_C$, is generated in response to this comparison. The $V_C$ control signal is filtered by a capacitor 127 and coupled to the emitter of PNP transistor 118 and the base of NPN transistor 126. The $V_C$ signal controls transistor 126. When the value of $V_C$ is large enough to turn transistor 126 ON, current flows through resistor 128 and a voltage across resistor 128 is developed. Generally speaking, the value of this voltage is dependent on $V_C$. As $V_C$ increases, so does the voltage across resistor 128 and vice versa.

The value of the voltage across resistor 128 establishes the threshold point at which current comparator 122 trips. Therefore, as the voltage across resistor 128 increases, the current threshold at which switch 108 turns off also increases to maintain a substantially constant output voltage. However, as mentioned above, current-mode voltage regulators can become unstable when the duty cycle exceeds 50% with fixed frequency and continuous current mode. To prevent this instability, a duty cycle proportional slope compensation signal may be subtracted from the feedback signal, i.e., the voltage across resistor 128, to increase the rate of current rise perceived by comparator 122. This is accomplished in FIG. 1 by applying the ramp signal from switch timing circuit 112 to a node between the emitter of transistor 126 and a resistor 125 (through a circuit generally depicted as controlled current source 113). As the ramp signal progresses toward its peak, the current injected at the emitter of transistor 126 increases, reducing its collector current, which causes the voltage across resistor 128 to decrease. Current comparator 122 interprets this as an increase in the rate of current rise in inductor 104. This causes the perceived rate of current rise in inductor 104 to be greater than the rate of current fall, which allows regulator 100 to operate at duty cycles greater than 50% without the duty cycle becoming unstable.

To prevent damage to switch 108, the maximum operating current of regulator 100 is limited to a certain level by placing a voltage clamp on the $V_C$ signal. Such a voltage clamp is typically implemented as shown in FIG. 1 using a PNP transistor 118 and a fixed voltage source 120. As long as the value of $V_C$ remains within a permissible operating range, voltage source 120 keeps the emitter-base junction of transistor 118 reverse-biased so that it acts as an open circuit. However, when $V_C$ attempts to rise above a preset maximum value, transistor 118 turns ON and starts to conduct. This diverts excess current away from the loop filter so that the voltage $V_C$ always remains at or below the preset maximum.

One undesirable consequence of slope compensation is that the true maximum current that can pass through switch 108 decreases proportionally as the duty cycle increases. This is because as the duty cycle increases, the effective magnitude of the slope compensation signal ($I_{SC}$) also increases, causing a significant decrease in voltage across resistor 128 during the latter ON portion of the duty cycle. This phenomenon is of concern to circuit designers because it prevents the full current supplying capabilities of regulator 100 from being utilized at higher duty cycles.

One way to correct this problem is to let $V_C$ rise above the maximum level imposed by the voltage clamp when slope compensation is used. This allows the maximum value of voltage across resistor 132 to remain substantially constant rather than decrease as the amount of slope compensation increases. Merely increasing the clamp voltage directly (e.g., by increasing the value of voltage source 120 with a signal varying at the compensation ramp rate) is not a viable solution because the large time constant of capacitor 127 will not allow the peak value of $V_C$ to respond to a changing clamp threshold fast enough. Moreover, simply adding the compensation voltage directly to $V_C$ nulls the effect of slope compensation.

Figure 2:
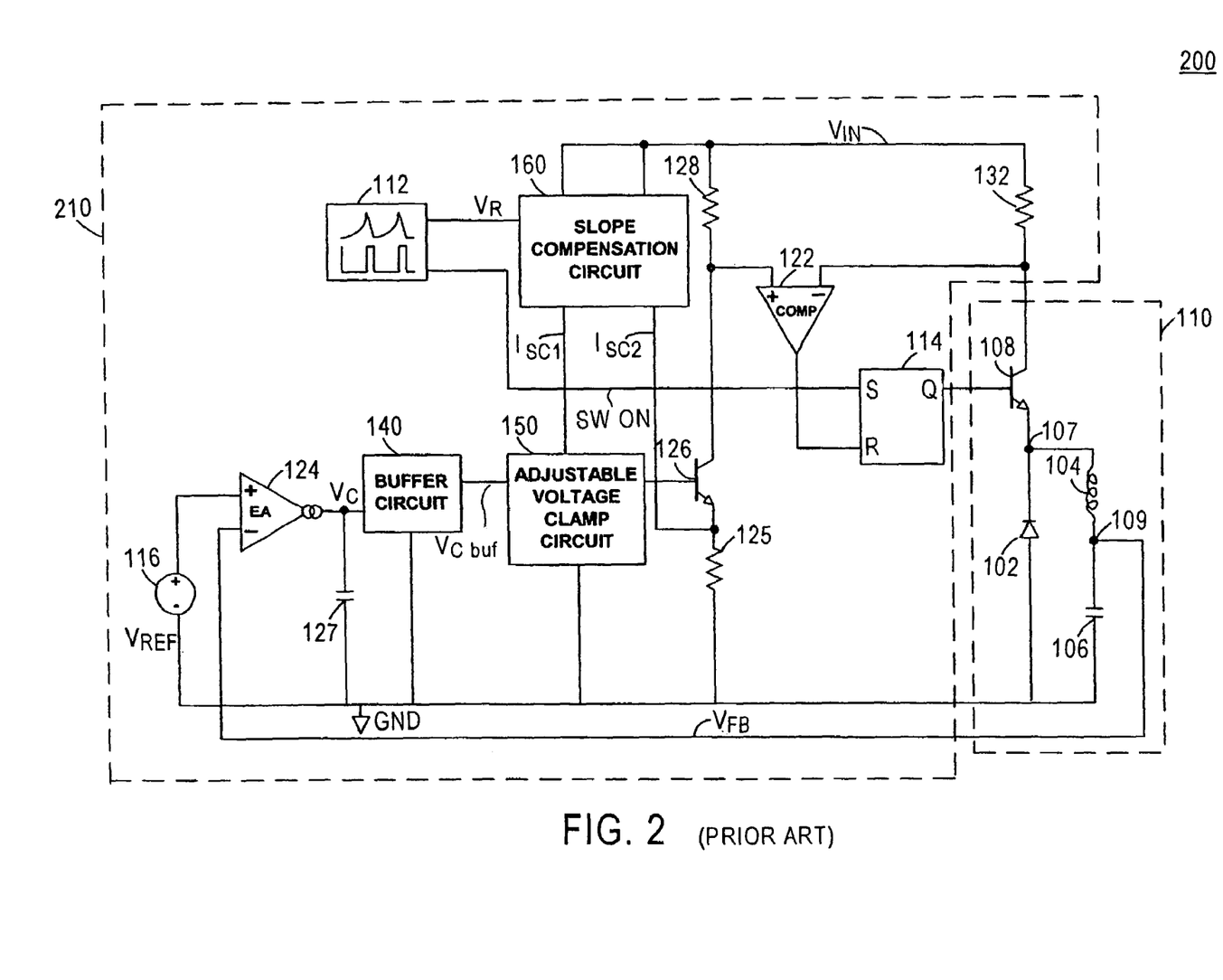
FIG. 2 depicts a conventional switching regulator using an adjustable limiter.

An alternative approach to maintain the same value of maximum current that can pass through switch 108 is to dynamically adjust the value of the limiter so that the effective maximum value of the supplied current to the inductor remains the same as when no compensating ramp is used, but the voltage Vc on the filter 127 is not changed at the clock rate. An exemplary circuit that dynamically adjusts the value of the limiter is shown in FIG. 2. Similar to the circuit of FIG. 1, the regulator of FIG. 2 includes output circuit 110, switch timing circuit 112, latch 114, reference voltage 116, comparator 122, error amplifier 124, resistors 125, 128, 132, transistor 126, and capacitor 127. In FIG. 2, regulator 200 has been modified by adding buffer circuit 140, adjustable voltage clamp circuit 150, and slope compensation circuit 160. With the addition of buffer 140, the $V_C$ clamp threshold can be adjusted by the slope compensation signal without changing the instantaneous value of Vc so that a substantially constant maximum current limit can be maintained at greater duty cycles. Detailed discussions of regulators with adjustable clamp circuit can be found in, for example, U.S. Pat. No. 6,498,466, titled "CANCELLATION OF SLOPE COMPENSATION EFFECT ON CURRENT LIMIT."

However, the additional components, such as the buffer circuit 140 and the adjustable voltage clamp circuit 150, that are needed to implement an adjustable limiter voltage as shown in FIG. 2 increase cost and design complexity. Furthermore, the use of two compensation currents, $I_{SC1}$ and $I_{SC2}$ in the circuit shown in FIG. 2 also add design complexity. The additional circuits needed in the circuit 210 shown in FIG. 2 also increase the die size of the part, which is undesirable in integrated circuit or semiconductor component designs. Moreover, the use of additional components, especially active components such as amplifiers, would increase consumption of power. Therefore, there is a need for a simpler circuit design for switching regulators with effective slope compensation.

SUMMARY OF THE DISCLOSURE

This disclosure presents improved switching regulators having simplified circuit design that provides slope compensation without changing the maximum current passing through a switch that controls the supply of power from a power source to a load.

An exemplary switching regulator circuit according to this disclosure provides a regulated voltage to a load. The regulator circuit comprises a power source and a switch circuit configured to control the supply of power from the power source to the load. A feedback circuit is provided for generating a feedback signal indicative of the regulated output voltage provided by the switching regulator circuit. The regulator circuit further includes a timing signal generator for generating a timing signal, a ramp signal generator for generating a ramp signal, and a current source controlled by the ramp signal, such as a current-controlled current source or a voltage-controlled current source, for generating a compensation signal indicative of the ramp signal. A sense signal circuit is also provided for generating a sensed signal indicative of the current supplied by the power source. A control circuit, coupled to the feedback circuit, the timing signal generator, the sensed signal circuit, the switch circuit and the current source, is provided to generate a control signal to control the operation of the switch circuit. The control circuit generates the control signal based on the timing signal, the compensation signal, the sensed signal and the feedback signal. The ramp signal is synchronized to the timing signal, such as a pulse clock signal.

In one embodiment, the compensation signal is subtracted from a signal varying with the difference between the feedback signal and a reference signal. The reference signal may be provided by a reference voltage source. For example, an error amplifier may be provided to compare the feedback signal with the reference signal. The resulting signal is passed through an amplifier with a reference voltage source, to generate an output signal proportional to the difference between the resulting signal and the reference voltage. The output signal is then passed through a limit circuit. A comparator is provided to compare the output of the limit circuit and a sensed signal indicative of the current passing to the load. The output of the comparator controls the operation of the latch. If the sensed signal is larger than the limit circuit output signal, the latch generates a control signal to control the switch circuit to stop supplying power from the power source to the load.

In one embodiment, an exemplary switching regulator circuit according to this disclosure includes a circuit to perform loop filtering and to couple the compensation signal to the output of the error amplifier which generates the signal varying with the difference between the feedback signal and the reference signal. The circuit may be implemented as a capacitor and a resistor connected in series. One end of the capacitor is coupled to the output of the error amplifier, and the other end of the capacitor is coupled to the resistor, which in turn couples to a DC voltage source referenced to the ground. The output of the current source controlled by the ramp signal is coupled to the resistor, such that the output voltage of the error amplifier is modified by the compensation signal provided by the current source without changing the voltage across the loop filter capacitor, and no further amplifier is needed.

Still other advantages of the presently disclosed methods and systems will become readily apparent from the following detailed description, simply by way of illustration of the invention and not limitation. As will be realized, the capacity planning method and system are capable of other and different embodiments, and their several details are capable of modifications in various obvious respects, all without departing from the disclosure. Accordingly, the drawings and description are to be regarded as illustrative in nature, and not as restrictive.

BRIEF DESCRIPTIONS OF THE DRAWINGS

The accompanying drawings, which are incorporated in and constitute a part of the specification, illustrate exemplary embodiments.

DETAILED DESCRIPTIONS OF ILLUSTRATIVE EMBODIMENTS

In the following description, for the purposes of explanation, numerous specific details are set forth in order to provide a thorough understanding of the present disclosure. It will be apparent, however, to one skilled in the art that the present method and system may be practiced without these specific details. In other instances, well-known structures and devices are shown in block diagram form in order to avoid unnecessarily obscuring the present disclosure.

Figure 3:
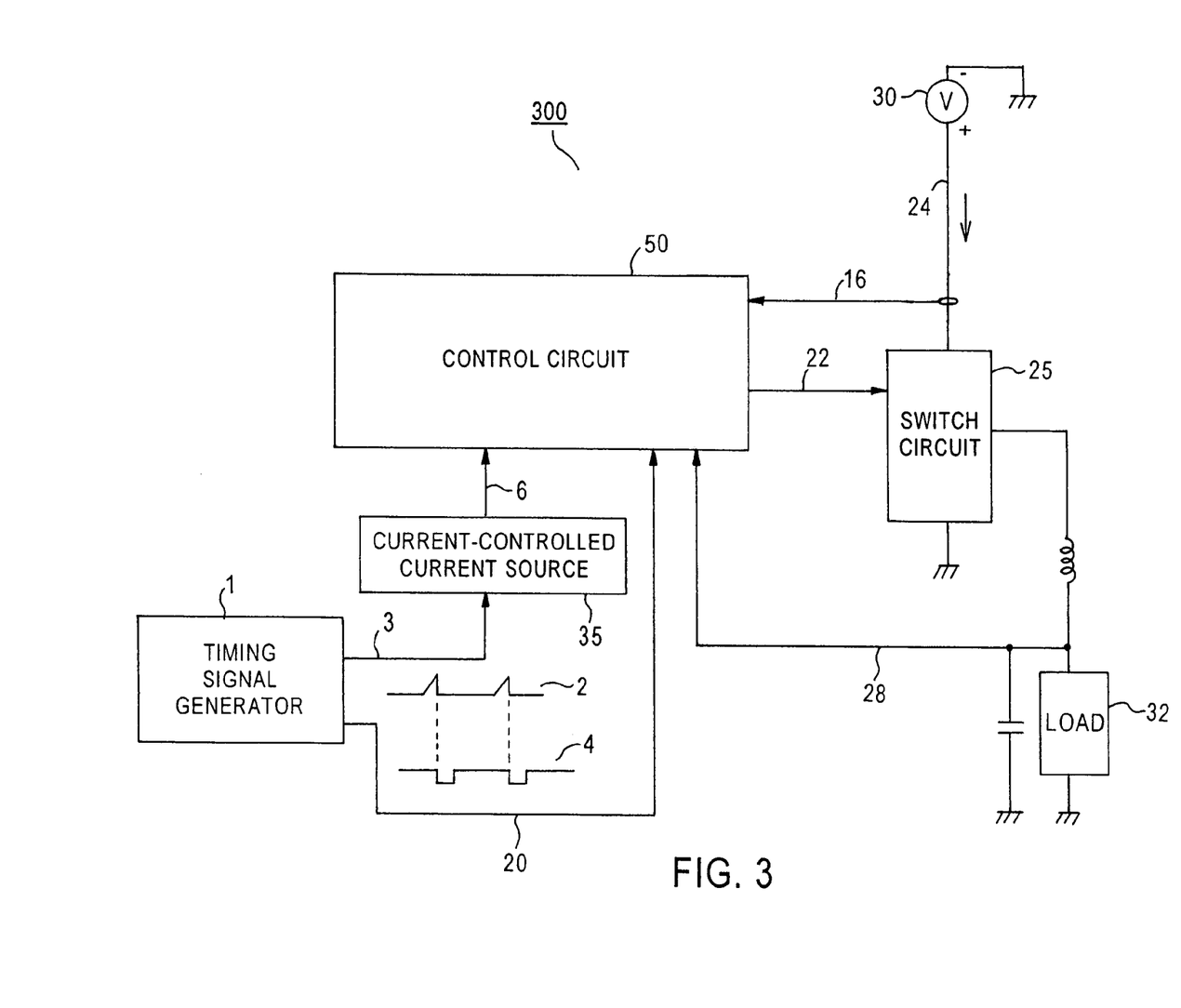
FIG. 3 shows an exemplary block diagram of a switching regulator using improved slope compensation according to this disclosure.

FIG. 3 depicts an exemplary block diagram of an exemplary switching regulator 300 with improved slope compensation according to this disclosure. Switching regulator 300 provides a predetermined and substantially constant output voltage to a load 32 from a voltage source 30. Switching regulator 300 includes a control circuit 50 that generates a control signal 22 to control the operation of a switch circuit 25, which in turn controls the coupling of load 32 to voltage source 30 or ground. Control signal 22 is slope-compensated to maintain operation stability of the duty cycle of switching regulator 300. Switch circuit 25 may be implemented by using bipolar junction transistor (BJT) or any other suitable switching element known to people skilled in the art. A timing signal generator 1, such as a clock generator, is provided to generate a clock signal 20 and a ramp signal 3. Ramp signal 3 is synchronized to clock signal 2. Current source 35 is controlled by ramp signal 3 to generate a compensation signal 6 that is indicative of the ramp signal 3. The compensation signal is applied to control circuit 50 for providing slope compensation to maintain stability of switching regulator 300 (discussed in more detail below). Current source 35 may be implemented as a current-controlled current source or a voltage-controlled current source controlled by ramp signal 3. The regulator 300 further includes a feedback loop to provide a feedback signal 28 to control circuit 50. Feedback signal 28 is indicative of the regulated voltage provided by switching regulator 300 to load 32. Regulator 300 further includes a sensed signal circuit coupled to control circuit 50, for generating a sensed signal indicative of the current supplied by voltage source 30. The sensed circuit may be implemented simply by providing a signal line to couple the current supplied by voltage source 30 to control circuit 50. Control circuit 50 generates control signal 22 based on sensed signal 16, compensation signal 6, feedback signal 28 and clock signal 20.

Figure 4:
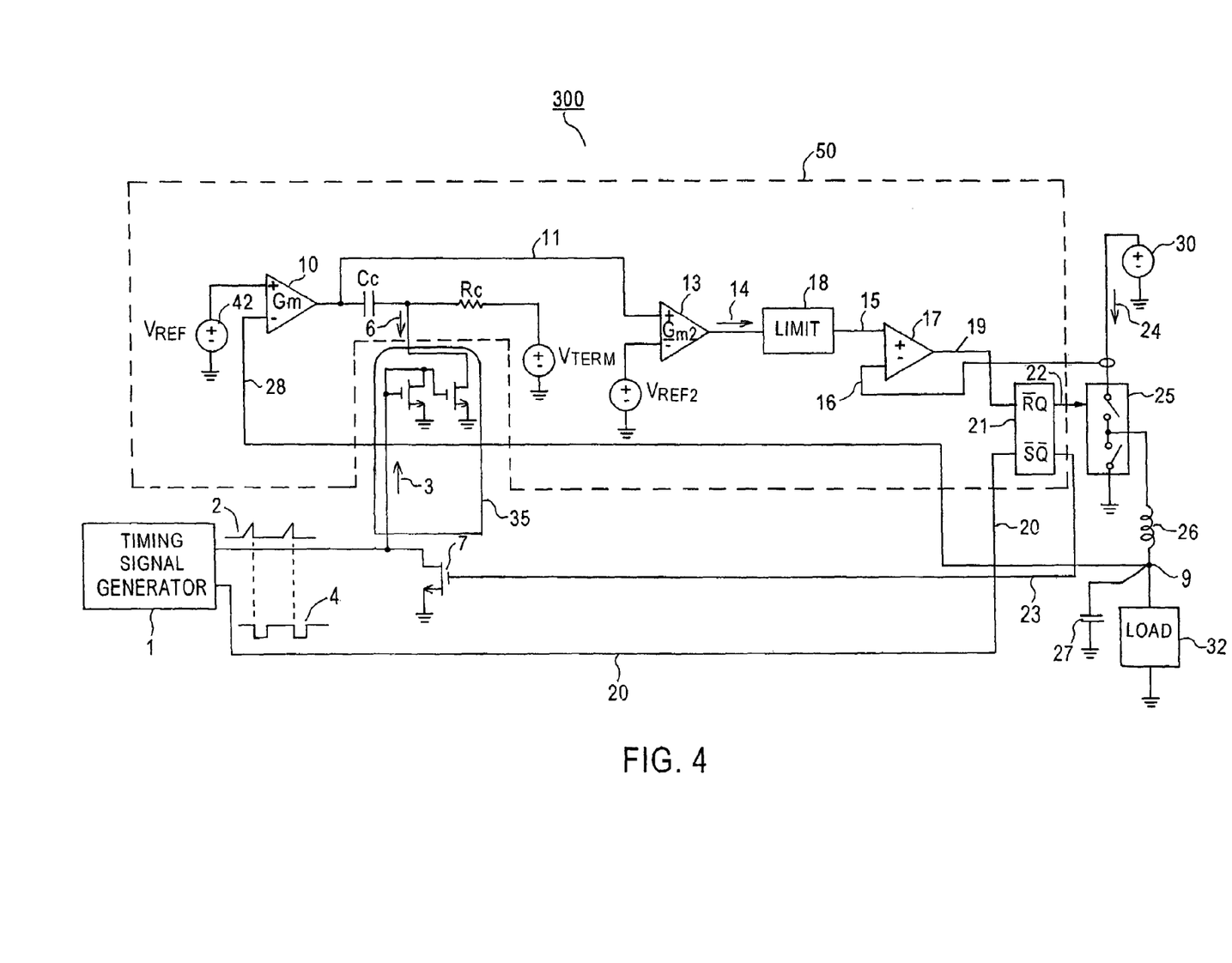
FIG. 4 is an exemplary detailed circuit diagram of a switching regulator using improved slope compensation according to this disclosure.

FIG. 4 is a detailed circuit diagram of the exemplary switching regulator 300 shown in FIG. 3. Switch circuit 25 is implemented, for example, using a SPDT (Single Pole, Double Throw) switch. The operation of the switching regulator 300 is controlled by control signal 22, and can be divided into two periods. The first period is when the upper contact of switch circuit 25 is ON and the lower contact is OFF; and the second period is when the upper contact of switch circuit 25 is OFF and the lower contact is ON. As shown in FIG. 4, control circuit 50 uses a latch 21 to generate control signal 22 to control the operation of switch circuit 25 as described above. A clock signal 20 is connected to the "set" input of latch 21. A falling edge of clock signal 20 sets latch 21, which in turn sets control signal 22 to logical "H". Control signal 22, when at logical "H", controls switch circuit 25 to turn ON the upper contact of switch circuit 25, and turn OFF the lower contact. As discussed earlier, this causes supply current 24 to flow from voltage source 30 through the upper contact of switch circuit 25 and inductor 26 to load 32. On the other hand, when control signal 22 is at logical "L", it controls switch circuit 25 to turn OFF the upper contact and turn ON the lower contact, which creates a closed current loop from ground through inductor 26 and load 32. The use of SPDT switch and specific logical operation modes described herein are for illustration purposes only. Other types or variations of switches and logical states well-known to people skilled in the art can be used to implement the features described herein.

Regulator output voltage at load 32 is sensed by a feedback loop that generates a feedback signal 28 feeding to an error amplifier 10. The output terminal of error amplifier 10 is coupled to an R-C filter comprising capacitor Cc and resistor Rc. Resistor Rc couples to ground via a DC voltage source Vterm. Error amplifier 10 may be implemented using a transconductance amplifier or other types of amplifiers known to people skilled in the art. Error amplifier 10 compares feedback signal 28 with a reference signal, such as a reference voltage provided by a fixed reference voltage 42, and generates an output current proportional to the voltage difference between the feedback signal 28 and fixed reference voltage 42.

As previously illustrated in FIG. 3, a current source 35 is controlled by ramp signal 3, and is provided to generate a compensation signal 6 indicative of ramp signal 3. Current source 35 may be implemented as a current-controlled current source or a voltage-controlled current source. For instance, a current-controlled current source is a device in which the output current mirrors or reflects the input current. The input current is supplied by a source and the output current is generated by a sink, or vice-versa, the input current is supplied by a sink and the output current is generated by a source. An example of a current-controlled current source is a current mirror shown as element 35 in FIG. 4. A current mirror may be implemented with either bipolar or field effect transistors. The simplest form of a current mirror may be implemented with an input device connected as a diode and a matched (but possibly area ratioed) output device connected to it so that the input device has the same control voltage ($V_{base-emitter}$ or $V_{gate-source}$) as the output device. As shown in FIG. 4, current-controlled current source 35 is connected to the R-C filter at a node between capacitor Cc and Resistor Rc. According to another embodiment, the output of current-controlled current source 35 is applied to Resistor Rc.

As discussed earlier, the R-C filter connects to ground via a DC voltage source Vterm, instead of connecting to ground directly. The connection to DC voltage source Vterm raises the voltage appearing at the node between capacitor Cc and resistor Rc. The DC value of $V_{TERM}$ is blocked from output signal 11 by loop filter capacitor Cc. It is noted that the voltage at the output of the R-C loop filter can be dynamically changed with a grounded current sink such as the compensation ramp without changing the charge on capacitor Cc and without the need of a negative power supply.

In operation, ramp signal 3 is applied through current-controlled current source 35 to generate a compensation signal 6, which is a sink current that reflects ramp signal 3, to the node between capacitor Cc and resistor Rc of the loop filter. Compensation signal 6 creates a compensation voltage proportional to the product of compensation signal 6 times the value of resistor Rc, which is effectively subtracted from the output voltage of error amplifier 10 to create an output signal 11. Since compensation signal 6 reflects ramp signal 3, the subtraction of the compensation voltage from the output of error amplifier 10 implements slope compensation as known in the art. Output signal 11 is then applied to an amplifier 13. Amplifier 13 generates an output current signal 14 proportional to the voltage difference between output signal 11 and the voltage of a reference voltage source Vref2. Output signal 14 is applied to a limit circuit 18 to generate an output voltage signal 15. An example of limit circuit 18 may comprise a resistor and parallel zener diode connected between node voltage 15 and ground (or similar clamp circuit known in the art).

As shown in FIG. 4, switching regulator 300 further includes a comparator 17 having a "+" input and a "−" input, and an output signal 19 coupled to the reset input of latch 21. A sensed signal 16 and limit output signal 15 are applied to the "−" input and "+" input of comparator 17, respectively. Sensed signal 16 is a signal changing with, or indicative of, supply current 24 supplied by voltage source 30. For example, a sensed signal may be a voltage proportional to supply current 24 generated by using a suitable sense resistor and level shifter or other means known to the art. As supply current 24 increases with time, sensed signal 16 also increases. When the voltage of sensed signal 16 exceeds that of output signal 15, comparator 17 generates an output signal 19 that changes from logical "H" to logical "L", which resets latch 21 and changes control signal 22 from logical "H" to logical "L". The state change of control signal 22 from logical "H" to logical "L" opens the top contact and closes the bottom contact of switch circuit 25. In response, current flows from ground through the bottom contact of switch circuit 25 and inductor 26 to load 32. Since the voltage at node 9 is greater than the zero voltage of ground, the current in inductor 26 decreases until the time of the next clock pulse falling edge of clock signal 20, which sets latch 21 and repeats the next cycle.

The slope compensation implemented according to this disclosure has several advantages over prior art implementations such as that shown in FIG. 2. For instance, the slope compensation described herein does not require additional buffer device 140, adjustable voltage clamp circuit 150, or a second compensation current, as required in the circuit shown in FIG. 2. The limit circuit 18, together with comparator 17 and latch 21, prevent supply current 24 from exceeding a preset value unaffected by the presence or absence of the stabilizing ramp signal 3. Also note that ramp signal 3 is pulled to ground through a transistor 7 after latch 21 has been reset and the level of signal 23 becomes logical "H". Pulling ramp signal 3 to ground when latch 21 is reset does not change function. Rather, it reduces the dynamic range required to output signal 11. A switching regulator according to this disclosure provides slope compensation by obtaining ramp signal 3 having waveform 2, from clock signal 20 having waveform 4, which has a level of zero for the first approximately 45% for the clock cycle and then rises until the end of the cycle at the falling edge of waveform 4. As a result, the incremental gain from node voltage 9 to current signal 24 is reduced. Thus, instability of switching regulator 300 is prevented.

Figure 5:
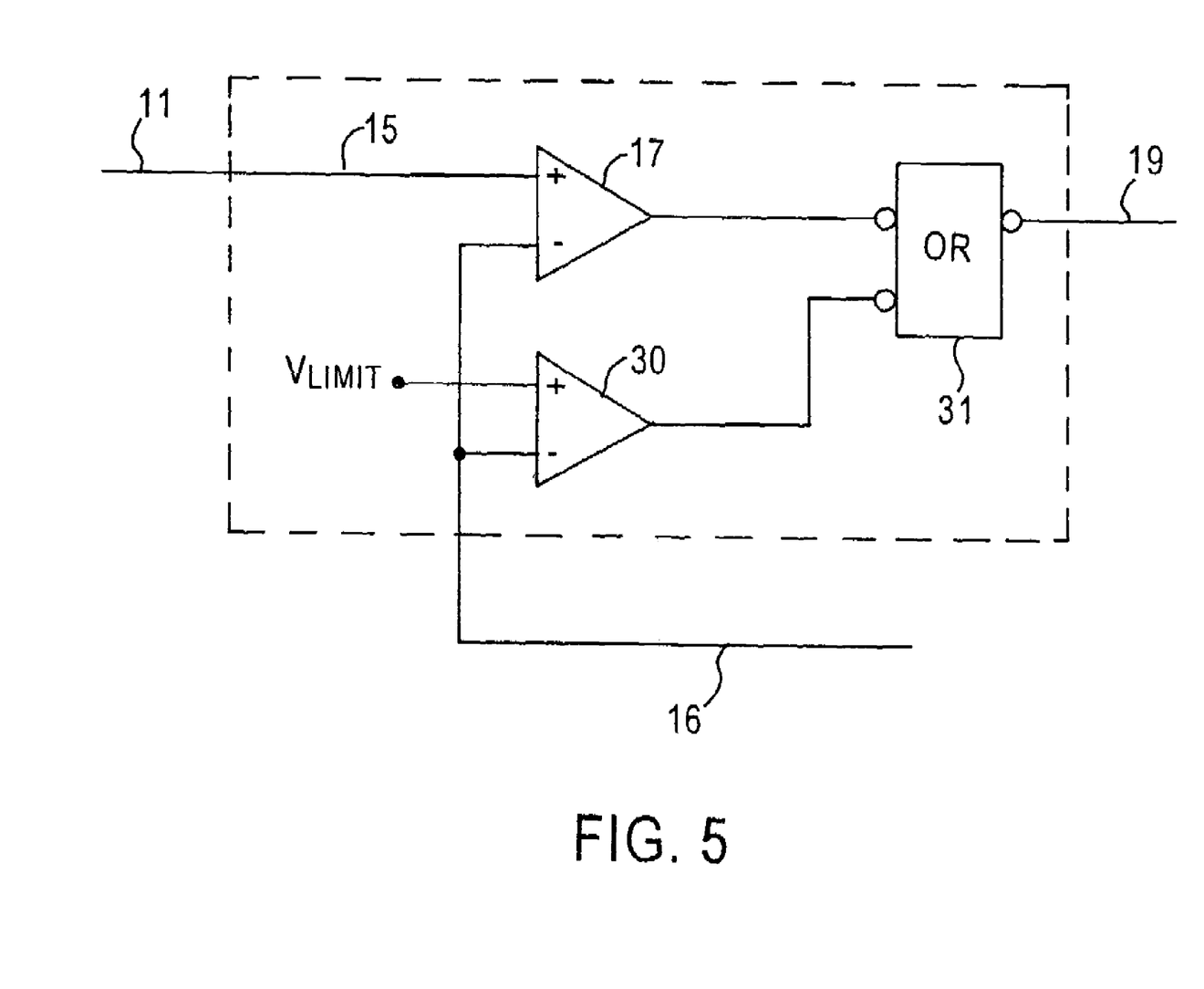
FIG. 5 shows a modified circuit design of the current limiter of a switching regulator using improved slope compensation according to this disclosure.

FIG. 5 shows a modified circuit configuration that can be used to replace amplifier 13, limit circuit 18 and comparator 17 as shown in FIG. 4. In FIG. 5, a second comparator 30 and an OR gate 31 are added. In this configuration, output signal 11 directly feeds to the "+" input of comparator 17, and sensed signal 16 is fed to the "−" inputs of comparator 17 and comparator 30. The respective output of comparator 17 and comparator 30 are coupled to the input of OR gate 31, which in turn generates an output signal 19' that connects to the reset input of latch 22. The performance of the circuit shown in FIG. 5 is identical to that described in FIG. 4, but amplifier 13 and the resistor and clamp diode of limit circuit 18 are eliminated.

Figure 6:
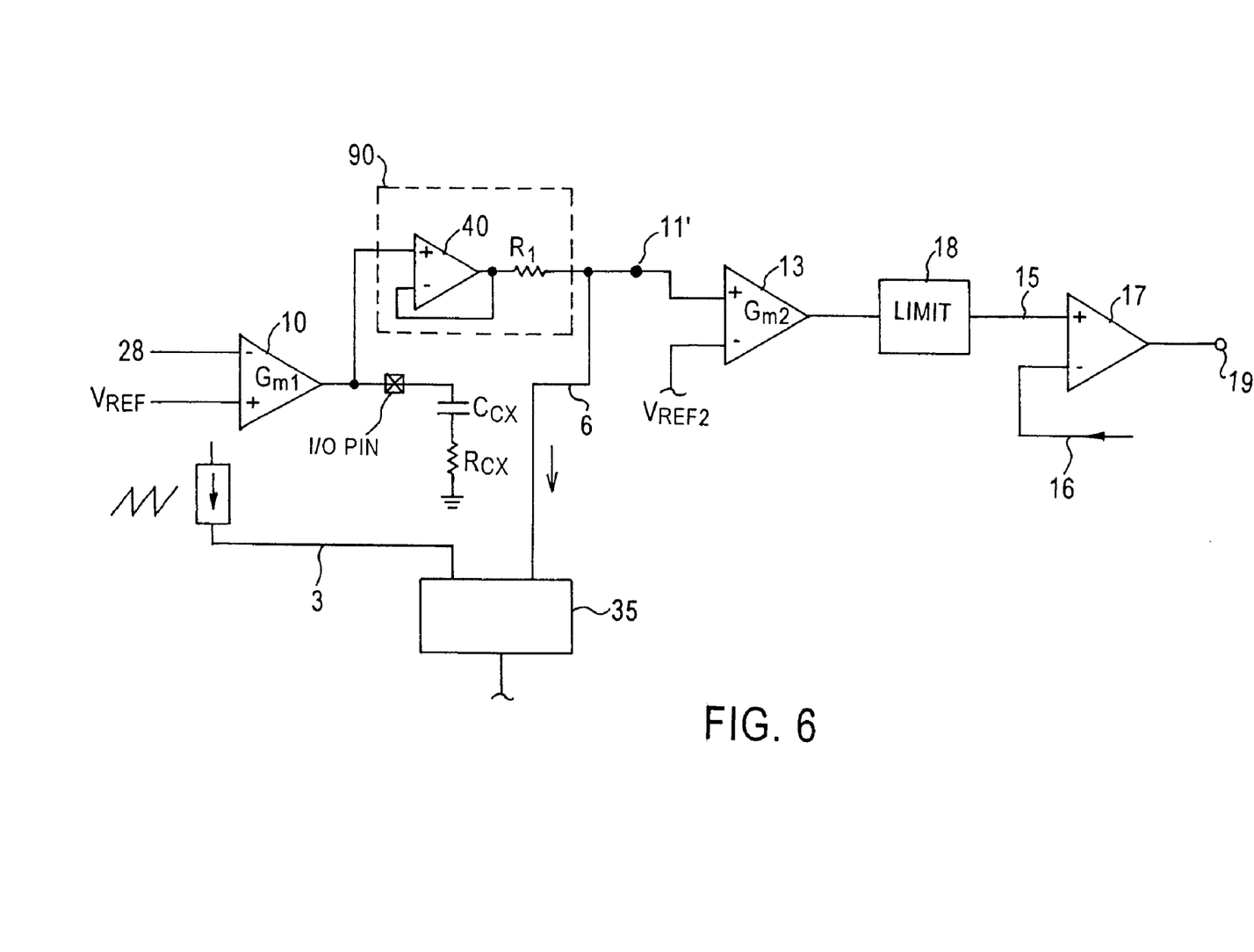
FIG. 6 depicts another modified circuit design of a switching regulator using improved slope compensation according to this disclosure.

If the switching regulator is implemented as an integrated circuit and the R-C loop filter is located external to the integrated circuit, the switching regulator may be implemented using another modified circuit configuration as shown in FIG. 6, at the cost of an added circuit 90 including a buffer amplifier 40 and resistor R1. An I/O pin is provided to couple to the output of error amplifier 10 to an R-C loop filter (Ccx and Rcx) outside the integrated circuit. Components and constituents of the circuit shown in FIG. 6 are identical to those of the circuit shown in FIG. 4, except for the added circuit 90. If the value of resistor R1 is identical to that of the resistor Rc shown in FIG. 4, then the output signal 11' in FIG. 6 would be the same as the output signal 11 in FIG. 4.

It is intended that all matter contained in the above description and shown in the accompanying drawings shall be interpreted as illustrative and not in a limiting sense. It is also to be understood that the following claims are intended to cover all generic and specific features herein described and all statements of the scope of the various inventive concepts which, as a matter of language, might be said to fall there-between.

What is claimed is:

1. A switching regulator circuit for providing a regulated voltage to a load, comprising:
    a power source;
    a switch circuit configured to control supply of power from the power source to the load;
    a feedback circuit for generating a feedback signal indicative of the regulated voltage;
    a timing signal generator for generating a timing signal;
    a ramp signal generator for generating a ramp signal;
    a sensed signal circuit for generating a sensed signal indicative of the current supplied by the power source;
    a current source controlled by the ramp signal for generating a compensation signal indicative of the ramp signal; and a control circuit, coupled to the current source, the timing signal generator, the feedback circuit and the sensed signal circuit, for generating a control signal based on the timing signal, the compensation signal, the sensed signal and the feedback signal, to control the switching of the switch circuit, wherein the power source and the load are coupled to a common terminal, the control circuit subtracts the compensation signal from a signal varying with the difference between a reference signal and the feedback signal, and the compensation signal couples to the signal varying with the difference between the feedback signal and the reference signal via a loop filter comprising a capacitor and a resistor, wherein the resistor couples to the common terminal via a DC voltage source.

2. The switching regulator circuit of claim 1, wherein the capacitor and the resistor are connected in series, and the compensation signal is applied to the resistor or couples to a node between the capacitor and the resistor.

3. A slope compensation method for controlling the operation of a switching regulator circuit including a switch circuit for controlling the supply of regulated voltage from a power source to a load, the method comprising the steps of:

generating a feedback signal indicative of the regulated voltage;

generating a sensed signal indicative of the current supplied by the power source;

generating a timing signal;

generating a ramp signal;

providing a current source controlled by the ramp signal for generating a compensation signal indicative of the ramp signal;

generating a control signal based on the compensation signal, the timing signal, the sensed signal and the feedback signal, to control the switching of the switch circuit;

generating a signal varying with the difference between the feedback signal and a reference signal;

subtracting the compensation signal from the signal varying with the difference between the feedback signal and the reference signal; and coupling the compensation signal to the signal varying with the difference between the feedback signal and the reference signal via a loop filter comprising a capacitor and a resistor, wherein the resistor couples to ground via a DC voltage source.

4. The method of claim 3, wherein the capacitor and the resistor are connected in series, and the compensation signal is applied to the resistor or couples to a node between the capacitor and the resistor.

* * * * *